Dec. 15, 1931.   J. V. MAZURIE   1,837,168
EXPANDING MILL ROLL
Filed Dec. 4, 1929   2 Sheets-Sheet 1

Inventor:
JAMES V. MAZURIE,
by
his Attorneys.

Dec. 15, 1931. J. V. MAZURIE 1,837,168
EXPANDING MILL ROLL
Filed Dec. 4, 1929 2 Sheets-Sheet 2
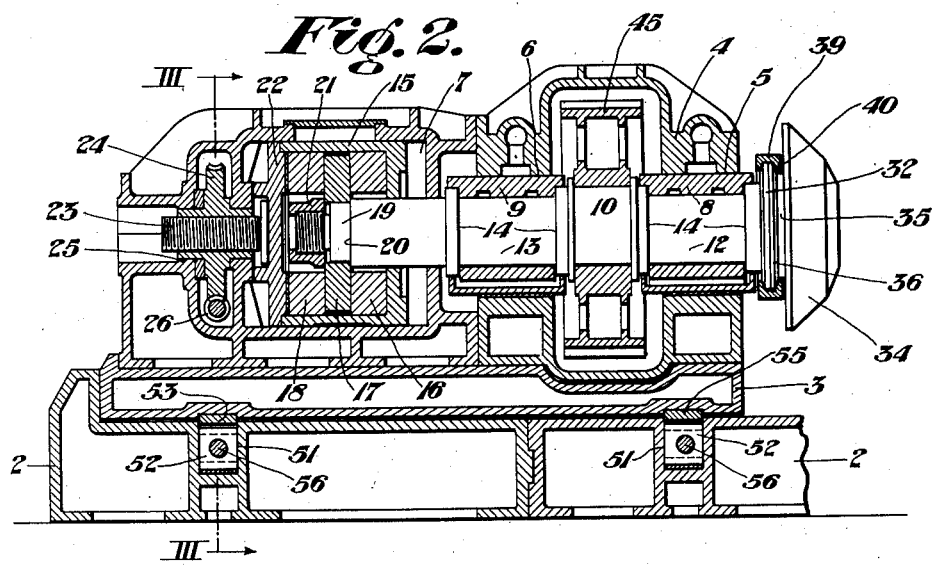
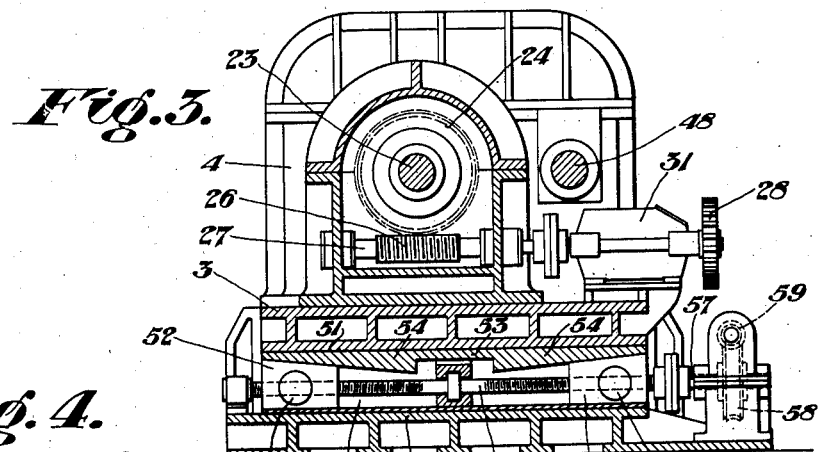
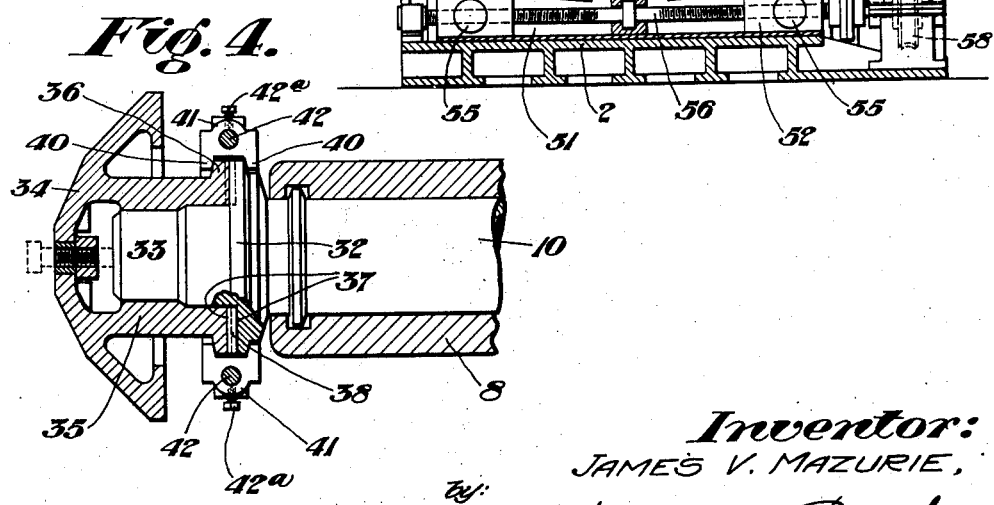
Inventor:
JAMES V. MAZURIE,
by
his Attorneys.

Patented Dec. 15, 1931

1,837,168

UNITED STATES PATENT OFFICE

JAMES V. MAZURIE, OF GARY, INDIANA

EXPANDING MILL ROLL

Application filed December 4, 1929. Serial No. 411,536.

This invention relates to expanding machines used in the manufacture of seamless tubes and more particularly to the rolls of said machines and has for its object the provision of a novel mounting whereby said rolls may be quickly attached to and detached from the roll-shafts.

Another object is to provide a novel mounting which will securely hold the roll on the shaft without weakening the shaft or roll by providing bolt holes in said parts as has been necessary in the mounting heretofore generally used.

In the drawings—

Figure 2 is an enlarged detail sectional elevation through one of the units of the machine showing the roll-shaft mounting.

Figure 3 is a sectional elevation taken on the line III—III of Figure 2.

Figure 4 is a fragmentary detail showing the roll mounting on the shaft.

Figure 1:
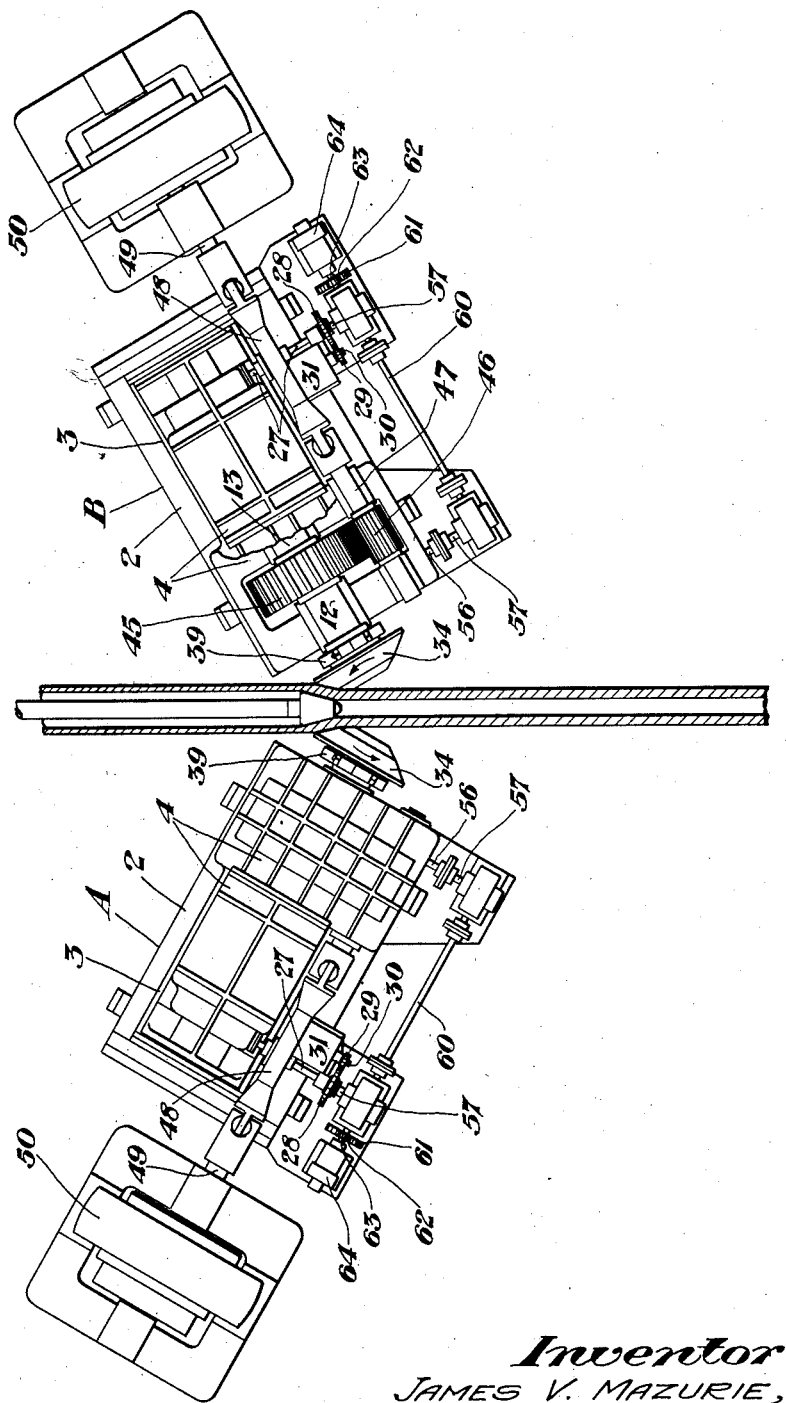
Figure 1 is a plan view of an expanding machine constructed in accordance with this invention.

Referring more particularly to the drawings, the letters A and B designate the roll units which go to make up the mill and which are of duplicate construction.

The units A and B each comprises a base 2 on which is mounted a housing bed-plate 3 supporting a housing 4.

The housing 4 is provided with bearing receiving openings 5, 6 and 7. The openings 5 and 6 are adapted to receive bearings 8 and 9 in which a roll-shaft 10 is journaled. The shaft 10 is reduced in diameter at its bearing points, as at 12 and 13, forming shoulders 14 at each end of the bearing points. The bearings 8 and 9 are divided longitudinally to form two parts which are fitted around the reduced diameter portions 12 and 13 of the shaft and said bearings are shaped to snugly fit between the shoulders 14 and thereby be held against longitudinal movement relative to the shaft. The bearings 8 and 9 have a sliding fit in the housing openings 5 and 6 and therefore the shaft 10 and bearings 8 and 9 may be bodily moved relative to the housing in a direction parallel with the longitudinal axis of the shaft.

A thrust-bearing assembly comprising a housing 15 and disks 16, 17 and 18 is slidably mounted in the opening 7 in the unit housing. The rear end of the shaft 10 extends into the bearing housing 15 and extends freely through the bearing disks 16 and 18. The disk 17 is mounted on a reduced end 19 of the shaft and clamped against a shoulder 20 by a nut 21.

The rear end of the bearing housing is closed by a thrust-plate 22 which is engaged by a threaded thrust-bar 23 which is threaded into the hub of a worm-wheel 24 journaled in a bearing opening 25 in the housing 4 and adapted to be rotated to move the thrust-bar 23 against or away from the thrust-plate 22 to thus adjust the longitudinal position of the roll-shaft 10.

The worm-wheel 24 is in mesh with a worm 26 carried by a shaft 27 which is journaled in the housing 4 and is provided at its outer end with a gear 28 which is meshed with a pinion 29 on the armature shaft 30 of a reversing motor 31.

It will thus be understood that the roll-shaft 10 may be readily adjusted longitudinally by energizing the motor 31 which will cause a rotation of the worm-wheel 24 which, in turn, serves as a nut to move the thrust-bar 23 toward or away from the thrust bearing, which bearing limits the endwise movement of the shaft 10.

In order to rotate the roll-shaft 10 a gear 45 is keyed or otherwise secured on the shaft 10 between the bearings 8 and 9, and said gear is in mesh with a drive-pinion 46 carried by a shaft 47 which is connected by a flexible coupling 48 with the armature shaft 49 of a drive-motor 50.

The head or roll end of the shaft 10 is provided with a peripheral flange 32 adjacent its end and a roll supporting stub 33 extends outwardly beyond said flange. The roll 34 which is of the usual frusto-conical type is provided with a sleeve portion 35 adapted to fit over the stub 33 and the sleeve 35 terminates in a peripheral flange 36 of the same diameter as the flange 32 on the shaft 10.

The faces of the flanges 32 and 36 are parallel and abut each other. In order to prevent rotation of the roll 34 relative to the shaft 10, the abutting faces of the flanges 32 and 36 are slotted to form key-ways 37 in which keys 38 are mounted.

The roll 34 is adapted to be removably held against displacement on the shaft 10 by an at least two-part clamping ring 39 which is grooved to provide flanges 40 extending down over the peripheral flanges 32 and 36 of the roll 34 and roll-shaft 10.

The parts of the ring 39 are provided with bolt lugs 41 to receive bolts 42 for securing the ring parts together. Set-screws 42ª are provided for locking bolts 42 against displacement.

It will be readily appreciated that the above construction permits quick change of the rolls and at the same time provides a secure and positive mounting.

It is necessary during the operation of the mill on different sizes of pipes to adjust the vertical position of the rolls 34 and heretofore this has been accomplished by adjusting the roll-shaft bearings vertically.

In the present construction, the roll-shaft bearings and roll shaft are so mounted that their vertical position relative to the housing is fixed and the vertical adjustment of the rolls is accomplished by adjusting the complete housing 4 and its assembled parts vertically.

In order to thus adjust the housing 4 vertically and thereby change the vertical positioning of the roll 34, the base 2 is provided with guideway grooves 51 adjacent each end in each of which are mounted a pair of oppositely positioned wedge-shaped adjusting blocks 52. The housing bed-plate 3 is provided with bearing plates 53 immediately above each of the grooves 51, which plates are provided with bearing surfaces 54 adapted to be engaged by the adjusting blocks 52 and inclined reversely to the inclined taper of the blocks 52.

When the blocks 52 are moved toward each other they will act as wedges against the inclined surfaces 54 of the plates 53 and elevate or lift the housing 4 vertically and when said blocks are moved away from each other the weight of the housing 4 and its assembled mechanism will cause the surfaces 54 of the plates 53 to ride down along the blocks 52 and thereby lower the housing and assembled mechanism.

In order to provide a simultaneous adjustment of all of the members or blocks 52 of each unit, each block is provided with a nut 55 which is in threaded engagement with a screw-shaft 56. Each of the shafts 56 is coupled to a shaft 57 having a worm-wheel 58 thereon which is meshed with a worm 59. The worms 59, in turn, have their shafts coupled to a connecting shaft 60 and the rear worm has its shaft provided with a gear 61 which is meshed with a pinion 62 on the armature shaft 63 of a reversing motor 64.

When the motor 64 is energized the screw-shafts 56 will be rotated to move the blocks 52 in or out and thus raise or lower the housing 4 and roll 34 according to the direction of rotation of the motor.

It will be readily appreciated that the roll mounting as provided in this machine may be readily assembled or disassembled. When it is desired to remove the roll, it is only necessary to loosen the set-screws 42ª and remove the bolts 42 after which the roll 34 may be readily slipped from the shaft 10.

When mounting the roll 34 it is slipped onto the stub 33 of the shaft 10 and the slots in the flange 36 of the roll are brought into registry with the slots in the flange 32 of the shaft to form the key-ways 37 and the keys 38 are mounted therein. The ring 39 is then assembled over the flanges 32—36 and locked in position by the bolts 42.

While I have shown and described one specific embodiment of my invention it will be understod that I do not wish to be limited thereto since various modifications may be made without departing from the scope of my invention, as defined in the appended claims.

I claim:—

1. In an expanding mill for expanding seamless tubes, a housing, a roll-shaft journaled in said housing, said shaft having its roll end projecting materially from said housing, a peripheral flange formed on said projecting end of said shaft at a point inward from the end thereof, a roll mounted on the projecting end of said shaft, said roll having a sleeve portion adapted to receive the end of said shaft, a peripheral flange on the end of said sleeve portion of approximately the same diameter as said flange on said shaft, said flanges being abutted, means for preventing relative rotation of said roll and said shaft, and means cooperating with said flanges for removably locking said roll against displacement from said shaft.

2. In an expanding mill for expanding seamless tubes, a housing, a roll-shaft journaled in said housing, said shaft having its roll end projecting materially from said housing, a peripheral flange formed on said projecting end of said shaft at a point inward from the end thereof, a roll mounted on the projecting end of said shaft, said roll having a sleeve portion adapted to receive the end of said shaft, a peripheral flange on the end of said sleeve portion of approximately the same diameter as said flange on said shaft, said flanges being abutted, means for preventing relative rotation of said roll and said shaft, and an at least two-part grooved locking-ring adapted to be fitted over said abutted flanges and locked in position to prevent displacement of said roll.

3. In an expanding mill for expanding seamless tubes, a housing, a roll-shaft journaled in said housing, said shaft having its roll end projecting materially from said housing, a peripheral flange formed on said projecting end of said shaft at a point inward from the end thereof, a roll mounted on the projecting end of said shaft, said roll having a sleeve portion adapted to receive the end of said shaft, a peripheral flange on the end of said sleeve portion of approximately the same diameter as said flange on said shaft, said flanges being abutted, key-ways in said flanges, keys in said key-ways adapted to prevent relative rotation of said roll and said shaft, and an at least two-part grooved locking-ring adapted to be fitted over said abutted flanges and locked in position to prevent displacement of said roll.

4. In an expanding mill for expanding seamless tubes, a housing, a roll-shaft journaled in said housing, said shaft having its roll end projecting materially from said housing, a peripheral flange formed on said projecting end of said shaft at a point inward from the end thereof, a roll mounted on the projecting end of said shaft, said roll having a sleeve portion adapted to receive the end of said shaft, a peripheral flange on the end of said sleeve portion of approximately the same diameter as said flange on said shaft, said flanges being abutted, key-ways in said flanges, keys in said key-ways adapted to prevent relative rotation of said roll and said shaft, an at least two-part grooved locking ring adapted to be fitted over said abutted flanges, said ring parts being provided with lugs adapted to abut each other when said ring is assembled, bolts mounted in apertures in said lugs for locking said ring parts together, and means for locking said bolts against displacement.

In testimony whereof, I have hereunto set my hand.

JAMES V. MAZURIE.